Dec. 14, 1937.    T. M. WALSH    2,102,244
METHOD AND APPARATUS FOR STEEPING COFFEE, TEA, AND THE LIKE
Filed July 3, 1936
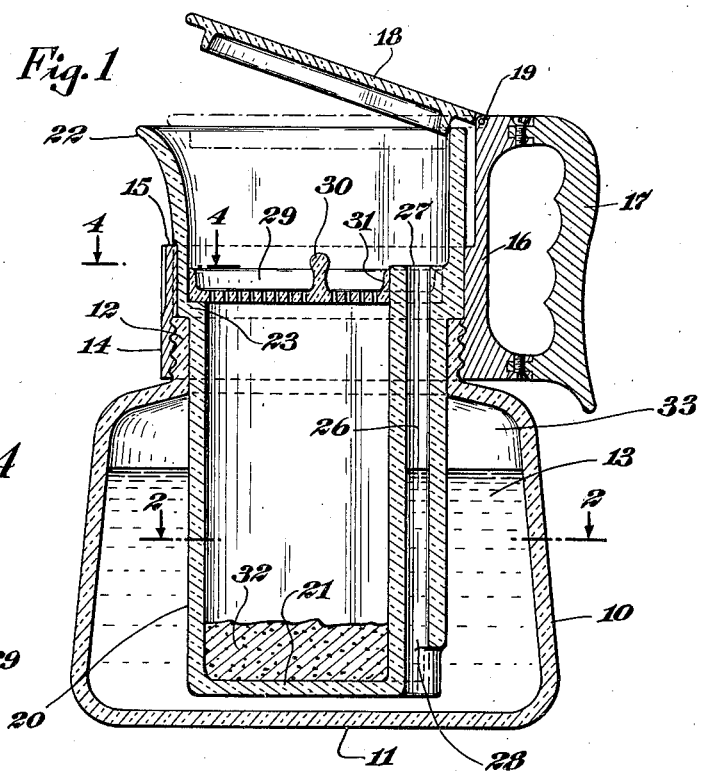
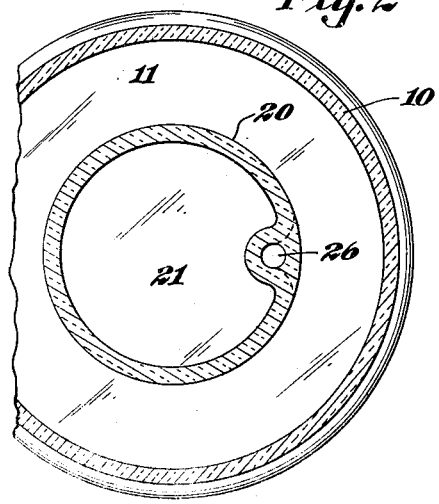
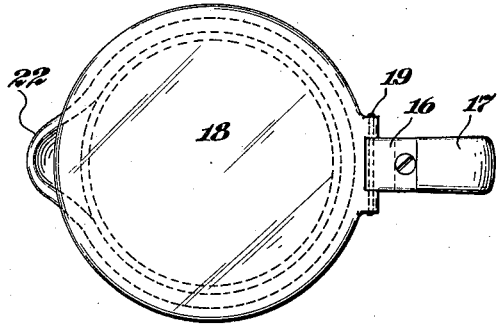
INVENTOR,
Thomas M. Walsh,
BY Frederick Breitenfeld
ATTORNEY.

Patented Dec. 14, 1937

2,102,244

UNITED STATES PATENT OFFICE 2,102,244

METHOD AND APPARATUS FOR STEEPING COFFEE, TEA, AND THE LIKE

Thomas M. Walsh, East Orange, N. J.

Application July 3, 1936, Serial No. 88,771

2 Claims. (Cl. 53—3)

My present invention relates generally to the art of making infusions, and has particular reference to an improved method and apparatus for steeping coffee, tea, and the like.

While I have herein illustrated and shall hereinafter describe my invention as it may be applied to the steeping of coffee, it is to be understood that certain phases of my invention have a wider applicability. Accordingly, the term "coffee", as used herein and in the appended claims, is intended to include within its significance such materials as tea and the like; and the term "water", as used herein and in the appended claims, is similarly intended to include within its significance any liquid in which a material is to be steeped.

It is a generally accepted belief that a coffee or tea infusion is of maximum palatability when the coffee or tea entering into the infusion is fresh. The term "fresh" generally signifies that the material still retains a substantial amount of the aromatic oils and other volatile ingredients which impart the well known aroma.

In the case of coffee, a heat treatment, usually referred to as "roasting", serves to release this aroma, and efforts are continuously made to retain the roasted coffee, before use, under conditions which will retain this aroma. If materials such as coffee and tea are heated immediately before an infusion is made, a similar release of aromatic ingredients takes place. I have found this to be true even in the case of coffee which is not entirely fresh. Accordingly, the quality and palatability of an infusion may be noticeably enhanced by preliminarily heating the coffee, tea, or other material immediately before it is steeped in a liquid such as water.

My present invention resides in the provision of a method and means for accomplishing this objective; and in accordance with my invention, a measured quantity of coffee and the like is simultaneously heated with a corresponding measured quantity of water or the like, and the heated water is applied to the heated or "roasted" coffee at the instant when the release of aromatic ingredients is at its maximum.

In the apparatus which I prefer to employ, I provide a vessel for water, a vessel for the coffee to be steeped, a means whereby heating of the water will simultaneously heat the coffee sufficiently to roast the latter and release its aroma, and an automatically operable delayed means for introducing the water into the coffee vessel only and immediately after the coffee has been roasted.

I achieve the foregoing objects, and such other objects as may hereinafter appear or be pointed out, in the manner illustratively exemplified in the accompanying drawing, wherein—

Figure 1 is an elevational cross-sectional view through a device embodying the features of my present invention;

Figure 2 is a cross-sectional view taken substantially along the line 2—2 of Figure 1;

Figure 3 is a top view of the device; and

Figure 4 is an enlarged cross-sectional view taken substantially along the line 4—4 of Figure 1.

In the embodiment which I have chosen for illustration, an outer vessel 10 is provided with a substantially circular and substantially flat bottom wall 11, and an upper, exteriorly threaded neck 12. This vessel may be composed of any suitable material, and I prefer to use glass or other transparent material capable of withstanding heat. This vessel is adapted to accommodate a measured quantity of water 13, and graduations or other markings may be applied on the vessel to permit predetermined quantities of water to be inserted.

In threaded engagement with the neck 12 is an element, composed of metal or other suitable material, having the threaded band portion 14, the sleeve portion 15, and the handle portion 16. A complementary handle portion 17, preferably of wood or the like, completes the provision of a handle by means of which the entire device may be grasped, transported from place to place, and tipped for purposes of pouring. A lid 18, preferably of glass, is hingedly connected, as at 19, to the portion 16.

An inner vessel 20 is removably insertable into the outer vessel 10, and is provided with the unperforated bottom wall 21 and the pouring spout or lip 22 at its upper end. The bottom wall, while shown substantially plane, may be ribbed or provided with annular corrugations to increase its surface area. The inner vessel 20 is preferably of substantially cylindrical cross-section and may be composed of glass or the like. It has a shouldered portion 23 which is adapted to rest upon the upper portion of the neck 12, thereby assuring a proper relationship of the two vessels when the device is assembled. Immediately below the shoulder 23, the inner vessel 20 is adapted to fit snugly into the neck 12, so that it constitutes a seal for the outer vessel 10. Immediately above the shoulder 23, the inner vessel 20 is shaped to fit snugly within the sleeve portion 15. To assure a proper disposition of the parts, the portion 15 is preferably provided with the rib 24, and the vessel 20 is provided with the corresponding depressed portion 25.

Formed as an integral part of the inner vessel 20 is a pipe 26 whose upper or outlet end 27 communicates with the upper portion of the inner vessel 20, and whose lower or inlet end 28 communicates with the lower portion of the outer vessel 10. For a purpose presently to be described, the lower end 28 of the pipe 26 preferably terminates a slight distance above the level of the bottom wall 21.

Though not essential, it is preferable to mount a strainer 29 in removable manner across the upper portion of the inner vessel. This strainer may consist of a disc of metal, glass, or the like, having perforations therein. It may have a handle 30; and it should have a lug or recess 31 which fits snugly around the upper end of the pipe 26.

Upon observing Figure 3, it will be noted that the lid 18 preferably does not seal the spout 22.

When the device is used, a measured quantity of coffee is placed into the inner vessel 20 and rests upon the bottom wall 21, as indicated by the reference numeral 32. A corresponding measured quantity of water is placed into the outer vessel 10. The two vessels are assembled into the relationship shown in Figure 1, and the device is placed upon a stove or similar source of heat. The heat thus applied to the bottom wall 11 accomplishes two things. It heats the water 13 and ultimately generates steam in the space 33 above the water level. It also heats the coffee 32 and thereby roasts the latter and causes a release of its aroma. This roasting procedure is strikingly manifest by the aroma which arises from the inner vessel and escapes through the upper portion of the device.

When steam is finally formed in the space 33, it exerts a downward pressure upon the water 13 and propels the latter upwardly through the pipe 26 into the upper portion of the inner vessel 20. This propulsion of water continues in a steady stream, pouring down upon the coffee 32, until the level of water in the outer vessel 10 reaches the lower end 28 of the pipe 26. After this time, any further generation of steam finds a ready escape through the pipe 26, into the upper portion of the inner vessel 20, and out through the spout 22. The latter thus serves as a safety outlet for the steam.

After the measured quantity of heated water has poured downwardly onto the measured quantity of roasted coffee, the infusion takes place, and the released aroma of the coffee, due to its preliminary roasting, results in the production of a beverage of highly desirable quality and palatability. This beverage may be poured, as desired, from the spout 22; and in the meantime it is kept heated by the water surrounding the bottom portion of the inner vessel below the level of the inlet end 28 of the pipe 26.

I am well aware of prior devices of various characters involving the propulsion of water from one vessel to another by the generation of steam. I believe I am the first, however, to provide a device in which the parts are so arranged that the coffee is preliminarily and automatically subjected to a heat treatment sufficient to roast the coffee and to release its aroma. This desirable result is accomplished by my present device because of the close proximity of the bottom walls 11 and 21. The space between these walls should be as small as possible, and the result is that the heat applied to the bottom wall 11 is transmitted with great efficiency to and through the bottom wall 21, thereby heating the coffee to the extent necessary to release its aromatic ingredients.

The present desirable result is attributable also to the arrangement of parts whereby the union of the water and the coffee is automatically delayed until both the water and the coffee have been preliminarily heated. What actually happens is that the heated water (in predetermined measured quantity) pours down upon the measured quantity of coffee while the latter is still being continuously subjected to the roasting process. As a result, the water meets the coffee at a time when the release of aromatic ingredients is at its maximum; and the resultant beverage is, therefore, of unusually desirable quality.

While my device is not intended for use with "stale" coffee, it has the unusual capability of releasing, even from stale coffee, a sufficient amount of residual aroma to make a palatable infusion. This is a desirable characteristic of the present device, permitting it to be universally useful.

Also, by virtue of the fact that the device releases the latent aromatic ingredients of the coffee, I have found that a lesser amount of coffee may generally be used to produce a given quantity of beverage.

Since there are innumerable ways in which the coffee vessel and the water vessel may be constructed, arranged, and assembled, I do not consider my invention to be limited to the specific structural details of the embodiment herein illustrated.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In a device for steeping coffee, an outer vessel having an upper neck and adapted to contain water, an inner vessel removably insertable through said neck and having a peripheral shoulder seated thereon and in sealing relation with said neck, said inner vessel having an unperforated bottom wall adapted to receive the coffee to be steeped, a pipe extending from the upper portion of the inner vessel to the lower portion of the outer vessel, whereby steam generated in the latter will force heated water up through the pipe into the inner vessel and onto said coffee, the bottom wall of the inner vessel being arranged in close proximity to the bottom wall of the outer vessel, so that the heat applied to the bottom wall of the outer vessel to generate said steam will simultaneously effect a preliminary roasting of said coffee, and a handle structure embracing and attached to the neck and having a top hinged thereto and covering the inner vessel.

2. In a device for steeping coffee, an outer vessel having an upper neck and adapted to contain water, an inner vessel removably insertable through said neck and having a peripheral shoulder seated thereon and in sealing relation with said neck, said inner vessel having an unperforated bottom wall adapted to receive the coffee to be steeped, a pipe extending from the upper portion of the inner vessel to the lower portion of the outer vessel, whereby steam generated in the latter will force heated water up through the pipe into the inner vessel and onto said coffee, the bottom wall of the inner vessel being arranged in close proximity to the bottom wall of the outer vessel, so that the heat applied to the bottom wall of the outer vessel to generate said steam will simultaneously effect a preliminary roasting of said coffee, and a handle structure embracing and attached to the neck and upper portion of the inner vessel and having a top hinged thereto and covering the inner vessel, said inner vessel having a discharge spout at the upper portion thereof open externally of said top.

THOMAS M. WALSH.